United States Patent Office 3,440,015
Patented Apr. 22, 1969

3,440,015
NONDESTRUCTIVE METHOD FOR
TESTING BATTERIES
Frederic M. Bowers and Regina D. Wagner, Silver Spring,
Md., assignors to the United States of America as represented by the Secretary of the Navy
No Drawing. Filed June 23, 1965, Ser. No. 466,486
Int. Cl. G01r *31/16*
U.S. Cl. 23—230                               11 Claims

ABSTRACT OF THE DISCLOSURE

A method for determining the capacity of a battery having a silver oxide electrode wtihout a destructive discharge by the steps of: placing a number of electrodes that have been manufactured and processed like that in the battery in a separate sealed compartment in the battery; removing one of the number of electrodes from the sealed compartment; and analyzing the removed electrode for Ag, AgO, and $Ag_2O$ content by a process including (1) separating the silver oxides from the Ag° in a portion of the removed electrode having a known weight by, first, treating the portion with $NH_4OH$ to solubilize the silver oxides into a soluble silver amine complex and, second, separating the soluble silver oxides from the Ag° by filtration, (2) weighing the remaining Ag° to determine the Ag° content, (3) determining the Ag content in the silver oxides by gravimetric chloride, (4) adding a saturated solution of KI to another portion of the removed electrode having a known weight to react with the AgO to produce $I_2$ which, in turn, reacts quantitatively with the Ag°, (5) determining the amount of $I_2$ liberated from the amount of $I_2$ that reacted with the Ag° and the amount of $I_2$ remaining in solution as measured by $Na_2S_2O_3$ titration, thereby determining the AgO content, and (6) determining the $Ag_2O$ content from the Ag content of the silver oxides and the AgO content, whereby the capacity of the battery may be determined by the chemical composition of said removed electrode.

---

The invention described herein may be manufactured and used by or for the Government of the United States of America for governmental purposes without the payment of any royalties thereon or therefor.

This invention pertains to both a novel method for indicating the capacity of a battery and to a novel method for determining the silver and silver oxides content of a sample. More particularly, it pertains to a nondestructive method for determining the capacity of a battery by chemical analysis and more specifically to a method for determining the capacity of a battery having a silver oxide electrode by determining its silver and silver oxides content.

Large stockpiles of batteries are often maintained for many purposes, and it would be advantageous to have an effective method for determining their capacity without prior activation and/or destructive discharge. For example, the fleet maintains a large stockpile of primary batteries for missiles and torpedoes and, in order to prevent an in-weapon use of a defective battery, the state of charge should be periodically tested. The state of charge has been determined by measuring voltage and current, but this necessitates activating and discharging the battery; and, since such batteries cost from about 3 to 4 thousand dollars, this method is not practical. Furthermore, it does not indicate the condition of the electrode which also affects the capacity of the battery.

Accordingly, it is an object of this invention to provide a nondestructive method for indicating the state of charge of a battery.

Another object of this invention is to provide a method for determining the capacity of a battery by chemical analysis.

A further object is to provide a novel method for determining the silver and silver oxides (AgO and $Ag_2O$) content of a sample.

Still another object is to provide a method for determining the capacity of a battery having a silver oxide electrode by analyzing its silver and silver oxides content.

These and many other objects will become readily apparent from reading the following detailed description of the invention.

The objects of this invention are accomplished by packaging electrodes that have been manufactured and processed exactly like those in the battery in a separate sealed compartment in the battery so that they will be subjected to the same environments as those in the battery. Whenever it is necessary to determine the capacity of the battery, an electrode is removed from the compartment, the compartment resealed, and its chemical composition analyzed. The state of charge of the battery can then be determined from a previously prepared graph that plots the relationship between the capacity of the battery (ampere-hours) and the composition of the electrode. Alternatively, a theoretical calculation of the capacity of the battery can be made by Faraday's law, since the weight and composition of the electrode are known.

In a battery that has a silver oxide electrode, the amount of silver oxides and silver present in the electrode will indicate the capacity of the battery according to the following reactions:

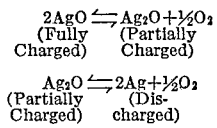

$$2AgO \rightleftharpoons Ag_2O + \tfrac{1}{2}O_2$$
(Fully      (Partially
Charged)   Charged)

$$Ag_2O \rightleftharpoons 2Ag + \tfrac{1}{2}O_2$$
(Partially    (Discharged)
Charged)     charged)

The amounts of these components may be determined by the novel silver-silver oxides analysis of this invention and the capacity of the battery may subsequently be determined from a previously prepared graph.

The novel silver-silver oxides analysis of this invention comprises the following two steps:

(1) Determining the amounts of silver metal and total silver present as oxides by separating the silver from the silver oxides.

(2) Determining the amount of AgO present by an iodometric determination of the oxidizing power of the sample.

A sample prepared from one of the additional silver oxide electrodes is divided into four portions with two portions being used in each step. In the first step, ammonium hydroxide is added to one of the portions to convert the silver oxides to a soluble amine complex. The soluble complex is separated from the solid silver by filtration and since it is unstable it is immediately decomposed by neutralization in order to prevent an explosion. The total silver in the separated oxides is determined by gravimetric chloride and the silver metal content is determined by weighing the separated solid silver.

In the second step, a saturated solution of potassium iodide which had been added to another portion of the sample is oxidized by the argentic oxide according to reaction (1) and reacts with the argentous oxide according to reaction (2).

(1)    $AgO + 3I^- + H_2O \rightarrow AgI_2^- + \frac{1}{2}I_2 + 2OH^-$
(2)    $Ag_2O + 4I^- + H_2O \rightarrow 2AgI_2^- + 2OH^-$ The iodine liberated by reaction (1) reacts with the silver metal present according to reaction (3).

(3)    $Ag° + \frac{1}{2}I_2 \rightarrow AgI$

Reaction (3) is quantitative when the concentration of potassium iodide is high enough to keep all the silver iodide dissolved. This reaction must take place quantitatively for the analysis of the sample to be accurate and if there is not sufficient iodine present to react with all of the silver present, more iodine must be added. After the reactions are complete, the amount of iodine that has not reacted is determined by titration with sodium thiosulfate.

The information obtained from the above procedure is used to calculate the amounts of Ag, AgO, and $Ag_2O$ present in the sample. The amount of silver present is calculated from the weighing of Step 1; the AgO, from the total amount of iodine liberated in reaction (1) (the sum of the iodine remaining in the solution as determined from the titration and the iodine that reacted quantitatively with the known amount of silver, less any iodine added); and the $Ag_2O$, from the known amount of silver present as oxides (Step 1) and the known amount of AgO (Step 2).

The invention may be more fully understood by reference to the following examples which are presented by way of illustration and are not to be construed as limiting the invention:

EXAMPLE I

The following reagents are used:
(1) Analytical quality nitric acid, hydrochloric acid, sulfuric acid and iodate free analyzed-grade potassium iodide.
(2) A 0.1 N sodium thiosulfate solution is prepared by idding 25 g. of reagent grade sodium thiosulfate crystals to 1 liter of freshly boiled distilled water containing 2–3 g. of borax crystals as a preservative. The solution is standardized with pure potassium iodate.
(3) A 0.1 N iodine solution is prepared by adding 6.5 g. of resublimed iodine to 500 ml. of distilled water containing 12 g. of potassium iodide. This solution is standardized just prior to and immediately after its use.
(4) A Sterox solution is prepared by adding approximately 0.5–1.0 ml. Fisher 1% Sterox solution to 500 ml. of distilled water.

Sample preparation

A sample electrode is wrapped in an envelope of glassine paper and the active material is worked loose from the grid. The silver-silver oxides mixture is transferred into an agate mortar and the agglomerates are broken by gentle crushing with an agate pestal. (Vigorous grinding or milling must be avoided because this alters the composition of the sample.) The sample is transferred to a small glass container with a tight fitting cap and it is mixed thoroughly by vigorous shaking. The mixture should be shaken prior to the removal of each aliquot to avoid obtaining a sample which is not homogeneous due to the settling of the larger particles. It is not necessary that the sample be moisture free prior to analysis, since the silver containing components are determined independently and the amount of impurities and moisture can be obtained by difference. However, the sample must be dry enough for an accurate determination of its weight.

The analysis of the sample is performed according to the following procedure:

Step 1

Weigh a 0.25–0.4 g. portion of the sample directly into a 30 ml. fine porosity filter crucible, which has previously been brought to a constant weight. Seat the crucible above a 500 ml. filtering flask containing 10 ml. 1:1 $HNO_3$ in a manner which permits the quantitative recovery of the filtrate. Slowly pour 15 ml. of 1:20 $NH_4OH$ into the crucible and allow the mixture to stand while the oxides of silver dissolve. After approximately one-half hour, apply a gentle suction to the filtering flask and remove most of the $NH_4OH$ solution from the crucible. Slowly pour another 15 ml. of 1:20 $NH_4OH$ into the crucible and allow the mixture to stand for an hour. The solids in the crucible should be stirred with a stream of distilled water occasionally to facilitate the dissolution of the $Ag_2O$. (Caution: Do not stir the mixture in the crucible with a stirring rod; this may cause an explosion of the silver amine complex.) The removal and replenishment of the $NH_4OH$ solution should be continued until all the silver oxide has dissolved. (Two 15 ml. portions of the $NH_4OH$ solution should be sufficient for dissolving the oxides in most samples; however, when the sample contains large amounts of $Ag_2O$, additional quantities of $NH_4OH$ solution are required.) When the silver oxides have dissolved, wash the silver metal in the crucible twice with 10 ml. of 1:20 $NH_4OH$ and several times with distilled water. Dry the crucible to a constant weight and determine the weight of the silver metal.

Quantitatively transfer the filtrate to a 400 ml. beaker. The solution should be acidic; if not, acidify with 1:1 $HNO_3$. Add 2 ml. of concentrated HCl to precipitate the silver as silver chloride. Heat the suspension nearly to boiling and then allow it to stand in the dark for a minimum of one hour. Collect the precipitate quantitatively in a previously weighed fine porosity filter crucible. Dry the crucible to a constant weight and determine the weight of the silver chloride.

Step 2

Weigh a 0.25–0.4 g. portion of the sample into a 125 ml. iodine flask. Add 10 g. of potassium iodide and rinse down the sides of the flask with approximately 5 ml. of Sterox solution a wetting agent that increases the rate of reaction between the silver and iodine. Swirl the flask until all the black silver oxide powder has dissolved. Add 10 ml. of 1 N $H_2SO_4$ and swirl the flask in subdued light for about 3–5 minutes to allow the oxidation of the silver metal to occur.

Begin the addition of $Na_2S_2O_3$ titrant. Stop the titration prior to its completion and examine the solution to determine if all the silver metal has been oxidized. If particles of silver metal can be seen on the bottom of the flask, swirl the flask until they are dissolved and then continue the titration until one drop titrant removes the iodine color.

If the number of milliequivalents of silver metal present in the sample is greater than or equal to the number of milliequivalents of AgO, it will be necessary to pipet a known volume of the standardized 0.1 N iodine solution into the flask. If silver metal remains unoxidized when the iodine color becomes pale, the addition of iodine is necessary. When iodine solution is added to the unknown an additional quantity of KI, approximately 5 g. KI for each 10 ml. of iodine solution, must also be added in order to keep all of the AgI in solution. The iodine can be added at any stage in the above procedure after the silver oxides have dissolved.

Because of the air oxidation of KI in acid solution, the volume of $Na_2S_2O_3$ used must be corrected to the volume necessary to titrate a blank. A blank should be run with each of the duplicate analyses.

The composition of the sample may be calculated from the information obtained above in the following manner:

CALCULATION OF SAMPLE COMPOSITION

1. Calculation of percent Ag°:
   Percent Ag° = (Wt. Ag° in g./Sample Wt.$^I$ in g.) ×100

2. Calculation of percent AgO:

$$\text{Percent AgO} = \frac{(\text{meq. I}° \text{ liberated})(\text{g. AgO/meq.}) \times 100}{(\text{Sample Wt.}^{II} \text{ in g.})}$$

meq. I liberated = (meq. I° found by titration) + (meq. I° used in Ag° oxidation) − (meq. I° added)

$$\text{meq. I used in oxidation} = \frac{(\text{Sample Wt.}^{II})(\text{percent Ag°}/100)}{(\text{g. Ag°/meq.})}$$

$$\text{Percent AgO} = \frac{\left[(\text{meq. I}° \text{ found}) + \frac{(\text{Sample Wt.}^{II})(\text{percent Ag°}/100)}{0.10787} - (\text{meq. I}° \text{ added})\right](0.12387)}{(\text{Sample Wt.}^{II} \text{ in g.})} \times 100$$

3. Calculation of percent Ag$_2$O:

$$\text{Percent Ag}_2\text{O} = \frac{[(\text{Wt. Ag in oxides}) - (\text{Wt. Ag due to AgO})][\text{M.W. Ag}_2\text{O}/2(\text{At. W. Ag})]}{(\text{Sample Wt.}^I \text{ in g.})} \times 100$$

Wt. Ag in oxides = Wt. AgCl (At. W. Ag/M.W. AgCl) = Wt. AgCl (.7526)
Wt. Ag due to AgO = [(Sample Wt.$^I$)(percent AgO/100)][At. W. Ag/M.W. AgO]

$$\text{Percent Ag}_2\text{O} = \frac{\{[(\text{Wt. AgCl})(.7526)] - [(\text{Sample Wt.}^I)(\text{percent AgO}/100)(.8708)]\}(1.0643)}{(\text{Sample Wt.}^I \text{ in g.})} \times 100$$

NOTE.—Sample Wt.$^I$ = Wt. of sample used in Step I. Sample Wt.$^{II}$ = Wt. of sample used in Step II.

EXAMPLE II

A silver oxide electrode was removed from a battery manufactured in 1958 and it was analyzed according to the procedure of Example I. The data obtained from the analysis is as follows:

I. Analysis for Ag°

|  | #1 | #2 |
|---|---|---|
| Wt. Tare and sample, g | 31.8368 | 31.0066 |
| Wt. Tare, g | 31.5805 | 30.6904 |
| Wt. Sample, g | 0.2563 | .3162 |
| Wt. Tare and Ag°, g | 31.6163 | 30.7354 |
| Wt. Ag°, g | 0.0358 | 0.0450 |
| Percent Ag° | 13.97 | 14.23 |
| Average | 14.1% | |

II. Analysis for Ag in Oxides

|  | #1 | #2 |
|---|---|---|
| Wt. Tare, g | 30.5628 | 31.2815 |
| Wt. Tare and AgCl, g | 30.8246 | 31.6030 |
| Wt. AgCl, g | 0.2618 | 0.3215 |
| Wt. Ag (Wt. AgCl×.7526), g | 0.1970 | 0.2419 |

III. Analysis for AgO

|  | #3 | #4 |
|---|---|---|
| Wt. Sample and Tare, g | 0.5088 | 0.5086 |
| Wt. Tare, g | 0.2422 | 0.2511 |
| Wt. Sample, g | 0.2666 | 0.2575 |
| Final Volume Na$_2$S$_2$O$_3$, ml | 4.57 | 4.33 |
| Initial Volume Na$_2$S$_2$O$_3$, ml | 0.08 | 0.06 |
| Total Volume Na$_2$S$_2$O$_3$, ml | 4.49 | 4.27 |
| Blank Volume, ml | 0.10 | 0.10 |
| Corrected Tot. Vol., ml | 4.39 | 4.17 |
| Gms. Ag° | 0.0379 | 0.0363 |

IV. Calculation of Percent AgO

|  | #3 | #4 |
|---|---|---|
| Meq. of I° found | 0.5527 | 0.5250 |
| Meq. of I° used by Ag° | 0.3486 | 0.3365 |
| Tot. meq. I° liberated | 0.9013 | 0.8615 |
| Gms. AgO | 0.1116 | 0.1067 |
| Percent AgO | 41.85 | 41.44 |
| Average | 41.6% | |

V. Calculation of Percent Ag$_2$O

|  | #1 | #2 |
|---|---|---|
| Wt. AgO in sample, g | 0.1066 | 0.1315 |
| Wt. Ag due to AgO, g | 0.0928 | 0.1145 |
| Wt. Ag due to Ag$_2$O, g | 0.1042 | 0.1274 |
| Gms. Ag$_2$O | 0.1109 | 0.1356 |
| Percent Ag$_2$O | 43.27 | 42.88 |
| Average | 43.1% | |

Percent Ag _____ 14.1
Percent AgO _____ 41.6
Percent Ag$_2$O _____ 43.1

EXAMPLE III

A silver oxide electrode was removed from a battery that was manufactured in 1964 by the same company that produced the battery of Example II and it was analyzed by the procedure of Example I. The results were as follows:

Percent Ag _____ 11.2
Percent AgO _____ 58.2
Percent Ag$_2$O _____ 29.0

The capacity of the battery can be calculated by Faraday's Law or from a previously prepared graph that relates the battery's capacity to the electrode's composition.

The process of this invention provides a simple means for determining the capacity of a battery without a destructive discharge. Since every battery has a limiting electrode, it is only necessary to analyze this electrode to determine the capacity of the battery. The sealed compartment, however, should contain both electrodes so that if there is any interaction between the battery electrodes in the dry state the additional electrodes will be subjected to the same conditions. The method of this invention may be used to determine the capacity of any battery but it is especially valuable for determining the capacity of primary batteries that are stockpiled by the fleet for use in torpedoes and missiles.

The novel silver-silver oxides analysis of this invention solves a long existing need in the art since heretofore there has been no practical way to accurately analyze a sample that contains silver, argentic oxide and argentous oxide. Although it has a particular applicability in the method of this invention for determining the capacity of a battery with a silver oxide electrode, it may be used to determine the silver-silver oxides content of any sample.

Obviously many modifications and variations of the present invention are possible in the light of the above teachings. It is therefore to be understood, that within the scope of the appended claims, the invention may be practised otherwise than as specifically described.

What is claimed is:
1. A method for determining the capacity of a battery having a silver oxide electrode without a destructive discharge, comprising the steps of:
   placing at least one additional electrode that has been manufactured and processed like that in the battery in a sealed compartment in the battery;

removing at least one of said additional electrodes from said sealed compartment; and analyzing said removed electrode for its content of Ag, AgO, and $Ag_2O$ by a process including the steps of:

separating the silver oxides from the free silver in a first portion of said removed electrode by:
treating said first portion with $NH_4OH$ to solubilize said silver oxides and
separating said soluble silver oxides from the silver metal, weighing the remaining silver metal, thereby determining the amount of free silver present, determining the amount of silver in said silver oxides by gravimetric chloride, adding a saturated solution of potassium iodide to a second portion of said removed electrode to react with the AgO to produce free iodine, said free iodine reacting quantitatively with said free silver, determining the amount of free iodine liberated from (1) the amount of free iodine that reacted with said free silver and (2) the amount of free iodine remaining in said solution measured by titration of sodium thiosulfate, thereby determining the amount of AgO present, and determining the amount of $Ag_2O$ present from the total amount of silver present as oxides and the amount of AgO present, whereby the capacity of the battery may be determined by the chemical composition of said removed electrode.

2. A method for determining the argentic oxide content of an admixture of free silver ($Ag°$), argentic oxide (AgO) and argentous oxide ($Ag_2O$), comprising:

determining the $Ag°$ content of said admixture;

adding a saturated solution of potassium iodide (KI) to a portion of said admixture having a known weight to react with the AgO to produce free iodine ($I_2$) which reacts quantitatively with the $Ag°$ to produce silver iodide (AgI); and determining the amount of $I_2$ produced from the reaction of KI with AgO by adding the amount of $I_2$ which reacted with the Ag to produce AgI to the amount of $I_2$ remaining in solution.

3. The method of claim 2 wherein the amount of $I_2$ remaining in solution is determined by titration with sodium thiosulfate ($Na_2S_2O_3$).

4. The method of claim 2 wherein the $Ag°$ content is determined by a process including:

separating the $Ag°$ from the AgO and $Ag_2O$ in a portion of said admixture having a known weight by:
treating said portion with ammonium hydroxide ($NH_4OH$) to solubilize the AgO and $Ag_2O$, and
separating the soluble AgO and $Ag_2O$ from the $Ag°$; and
weighing the $Ag°$, whereby the $Ag°$ content of said admixture may be calculated.

5. A method for determining the free silver ($Ag°$), argentic oxide (AgO), and argentous oxide ($Ag_2O$) content of an admixture of $Ag°$, AgO, and $Ag_2O$, wherein the AgO content is determined by the method of claim 2.

6. A method for determining the capacity of a battery having a silver oxide electrode without a destructive discharge, comprising:

placing at least one additional electrode that has been manufactured and processed like that in the battery in a sealed compartment in the battery;

removing at least one of said additional electrodes from said sealed compartment; and analyzing said removed electrode for its free silver (Ag), argentic oxide (AgO), and argentous oxide ($Ag_2O$) content by the method of claim 5.

7. A method for determining the argentic oxide content of an admixture of free silver ($Ag°$), argentic oxide (AgO), and argentous oxide ($Ag_2O$), comprising:

determining the $Ag°$ content of said admixture;

adding a saturated solution of potassium iodide (KI) to a portion of said admixture having a known weight to react with the AgO to produce free iodine ($I_2$) which reacts quantitatively with the $Ag°$ to produce silver iodide (AgI);

adding a sufficient amount of $I_2$ solution to react completely with the remaining $Ag°$ to produce additional AgI; and determining the amount of $I_2$ produced from the reaction of KI with AgO by adding the amount of $I_2$ which reacted with Ag to produce AgI to the amount of $I_2$ remaining in solution and subtracting the amount of $I_2$ added by the adding of the $I_2$ solution.

8. The method of claim 7 wherein the amount of $I_2$ remaining in solution is determined by titration with sodium thiosulfate ($Na_2S_2O_3$).

9. The method of claim 7 wherein the $Ag°$ content is determined by a process including:

separating the $Ag°$ from the AgO and $Ag_2O$ in a portion of said admixture having a known weight by:
treating said portion with ammonium hydroxide ($NH_4OH$) to solubilize the AgO and $Ag_2O$, and
separating the soluble AgO and $Ag_2O$ from the $Ag°$; and
weighing the $Ag°$, whereby the $Ag°$ content of said admixture may be calculated.

10. A method for determining the free silver ($Ag°$), argentic oxide (AgO), and argentous oxide ($Ag_2O$) content of an admixture of $Ag°$, AgO, and $Ag_2O$, wherein the AgO content is determined by the method of claim 7.

11. A method for determining the capacity of a battery having a silver oxide electrode without a destructive discharge, comprising:

placing at least one additional electrode that has been manufactured and processed like that in the battery in a sealed compartment in the battery;

removing at least one of said additional electrodes from said sealed compartment; and analyzing said removed electrode for its free silver ($Ag°$), argentic oxide (AgO), and argentous oxide ($Ag_2O$) content by the method of claim 10.

References Cited

UNITED STATES PATENTS

| | | | |
|---|---|---|---|
| 1,407,489 | 2/1922 | Shakespeare | 136—82 |
| 2,767,063 | 10/1956 | Chesney | 23—230 |
| 2,988,590 | 6/1961 | André | 136—82 |

OTHER REFERENCES

Anon.: C.A. 58:12163e (1963).

Kovaleva et al.: C.A. 60:2527d (1964).

R. C. Brasted: "Comprehensive Inorganic Chemistry," vol. 3, p. 90, D. Van Nostrand Co., Inc., New York, 1954.

MORRIS O. WOLK, *Primary Examiner.*

S. MARANTZ, *Assistant Examiner.*

U.S. Cl. X.R.

136—182